United States Patent Office 3,328,386
Patented June 27, 1967

3,328,386
MONOAZO HYDROXYNAPHTHOXY ALKANOIC
ACID CONTAINING COMPOUNDS
Milton Green, Newton, Mass., assignor to Polaroid Corporation, Cambridge, Mass., a corporation of Delaware
No Drawing. Filed Mar. 4, 1963, Ser. No. 262,357
16 Claims. (Cl. 260—202)

This invention relates to novel compounds and, more particularly, to novel α-naphthol intermediates.

It is one object of this invention to provide novel chemical compounds useful as intermediates in the preparation of azo dyes and dye developers.

It is another object of this invention to provide novel azo dyes which may be employed as intermediates in the synthesis of other azo dyes and dye developers.

Yet another object of this invention is to provide a novel class of α-napthol compounds useful in accomplishing the aforementioned objectives.

A further object of this invention is to provide a novel method of synthesizing these novel intermediates.

Other objects of the invention will in part be obvious and will in part appear hereinafter.

The invention accordingly comprises the process involving the several steps and the relation and order of one or more of such steps with respect to each of the others and the products possessing the features, properties and relation of elements which are exemplified in the following detailed disclosure, and the scope of the application of which will be indicated in the claims.

For a fuller understanding of the nature and objects of the invention, reference should be had to the following detailed description.

The novel intermediates of this invention may be defined as hydroxynaphthoxyalkanoic acids of the formula:

(A)
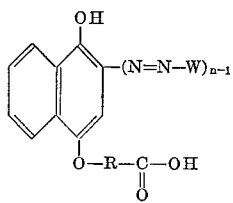

wherein R is a lower alkylene group, W is the radical of a diazotizable amine, and $n$ is a positive integer from 1 to 2; and nuclear substituted derivatives thereof, e.g., derivatives wherein one or more hydrogen atoms of the naphthalene nucleus have been replaced by various substituents such as alkyl, alkoxy radicals, etc. α-Naphthols containing such substituents are known in the art and per se comprise no part of the present invention.

Where $n$ is 1, the novel intermediates of this invention may be represented by the formula:

(B)
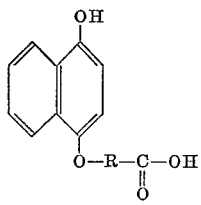

The novel unsubstituted intermediates of Formula B may be prepared by reacting naphthoquinone with a compound of the formula:

(C) 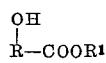

wherein $R^1$ is an alkyl group, preferably a lower alkyl group, e.g., ethyl, with the reaction being carried out in the presence of a reducing agent such as stannous chloride and hydrochloric acid. The reaction product is then hydrolyzed to yield the intermediate illustrated by Formula B.

Particularly useful intermediates are obtained where the compounds of Formula C are secondary alcohols.

The preferred compound within the scope of the Formula B is:

(1)
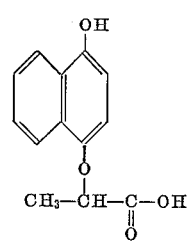

α-(4-hydroxy)-1-naphthoxypropionic acid

As examples of other compounds within the scope of Formula B, mention may be made of:

(2)
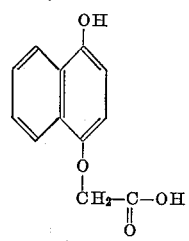

4-hydroxy-1-naphthoxyacetic acid (3)
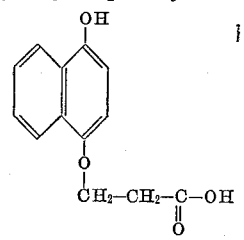

β-(4-hydroxy)-1-naphthoxypropionic acid (4)
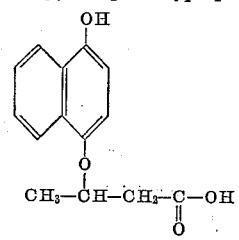

β-(4-hydroxy)-1-naphthoxybutyric acid (5)
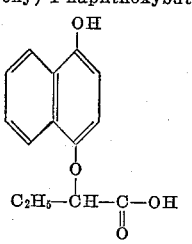

α-(4-hydroxy)-1-naphthoxybutyric acid

When n is 2, the novel compounds of this invention may be represented by the formula:

(D) 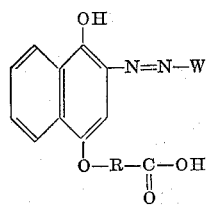

Compounds of the Formula D which are azo dyes themselves, but which are particularly useful as intermediates in the preparation of other azo dyes, may be prepared by diazotizing an amine of the formula:

(E)                 $H_2N-W$ and coupling the diazonium compound with a compound of Formula B.

In many instances, the diazonium compound may be coupled with an ester of the compound of Formula B and the resulting compound may then be hydrolyzed to yield the desired acid. In other words, the hydrolysis step to form the compounds of Formula B may be eliminated and the ester first coupled with the diazonium salt, after which the hydrolysis step may be performed to form the acid of Formula D. It will be appreciated however, that where the substituent W contains a hydrolyzable group which will hydrolyze under the reaction conditions employed to effect conversion of the ester to the acid, the hydrolysis step should be performed before coupling, e.g., the diazonium salt should be coupled with an acid of Formula B, rather than with its ester.

As examples of diazotizable amines within the scope of Formula E, mention may be made of the following compounds:

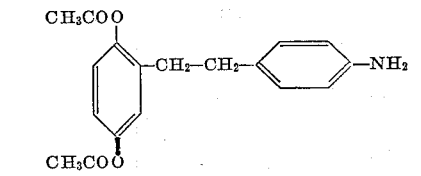
p-(β-2,5-diacetoxyphenethyl)aniline

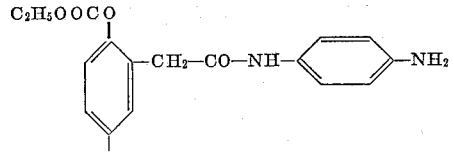
p-(β-2,5-dicathyloxy-phenylacetamido)aniline

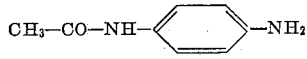
p-acetamidoaniline

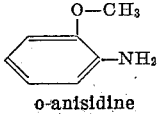
o-anisidine

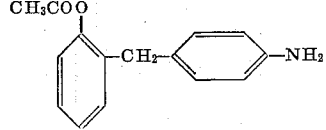
p-(2,5-diacetoxyphenylmethyl)aniline

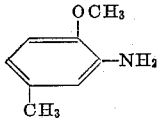
2-methoxy-5-methyl aniline

As examples of compounds of Formula D which may be prepared by employing as one of the starting materials, α-(4-hydroxy)-1-naphthoxy-propionic acid, the preferred compound of Formula B, mention may be made of the following compounds:

(6) 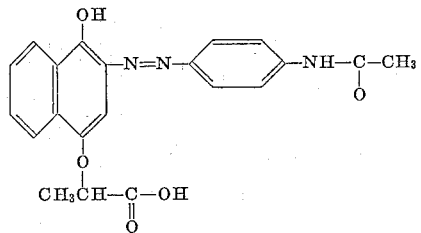

α-[3-(2'-methoxy)-phenylazo-4-hydroxy-1-naphthoxy]-propionic acid (7) 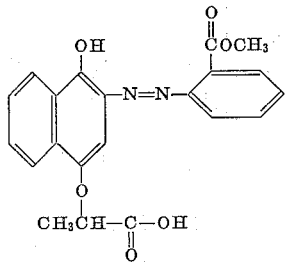

α-[3-(p-acetamido)-phenylazo-4-hydroxy-1-naphthoxy]-propionic acid (8) 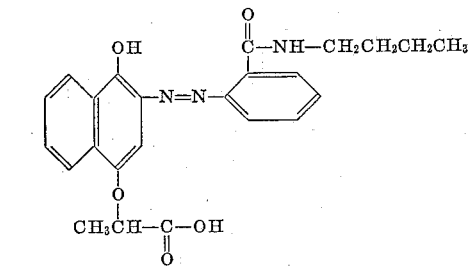

α-[3-(2'-carbomethoxy)-phenylazo-4-hydroxy-1-naphthoxy]-propionic acid (9) 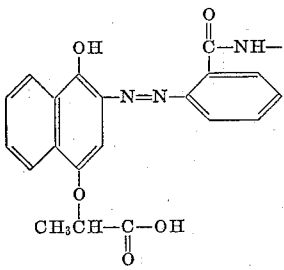

α-[3-(2'-[N-butyl]-carbamyl)-phenylazo-4-hydroxy-1-naphthoxy]-propionic acid

(10) 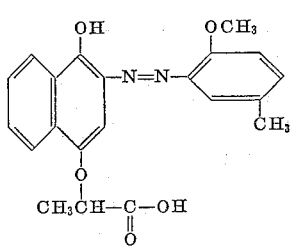

α-[3-(2'-methoxy-5'-methyl)-phenylazo-4-hydroxy-1-naphthoxy]-propionic acid

(11)
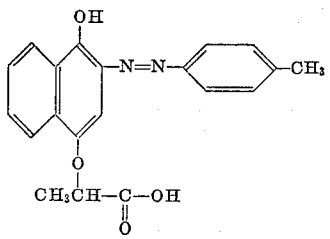

α-[3-(4'-methyl)-phenylazo-4-hydroxy-1-naphthoxy]-propionic acid

(12)
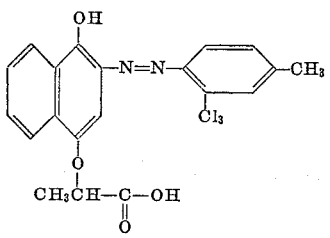

α-[3-(2'-chloro-4'-methyl)-phenylazo-4-hydroxy-1-naphthoxy]-propionic acid

(13)
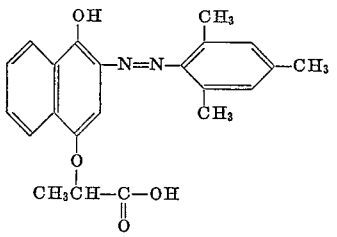

α-[3-(2',4',6'-trimethyl)-phenylazo-4-hydroxy-1-naphthoxy]-propionic acid

(14)
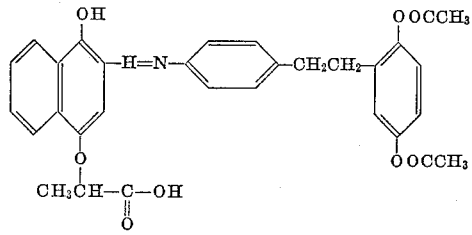

α-[3-4'-(β-2'',5''-diacetoxyphenethyl)-phenylazo-4-hydroxy-1-naphthoxy]-propionic acid

(15)
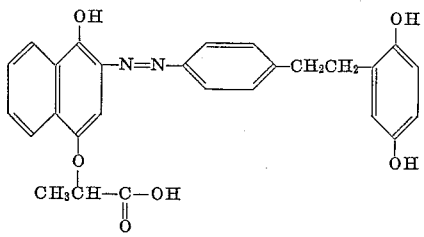

α-[3-p-(β-hydroquinonylethyl)-phenylazo-4-hydroxy-1-naphthoxy]-propionic acid

(16)
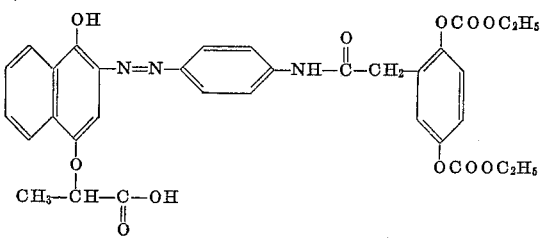

α-[3-(p-diæthyloxyhomogentisamido)-phenylazo-4-hydroxy-1-naphthoxy]-propionic acid

(17)
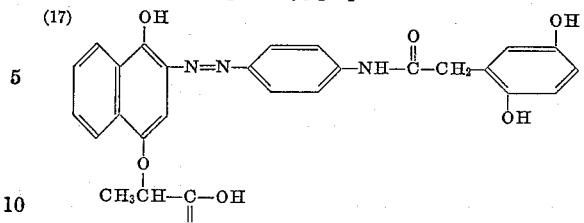

α-[3-(p-homogentisamido)-phenylazo-4-hydroxy-1-naphthoxy]-propionic acid

(18)
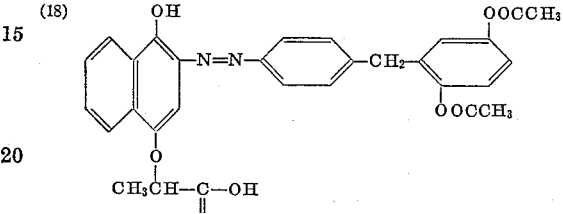

α-[3-4'-(2'',5''-diacetoxyphenylmethyl)-phenylazo-4-hydroxy-1-naphthoxy]-propionic acid

(19)
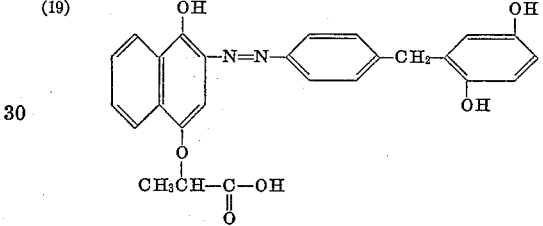

α-[3-(p-hydroquinonylmethyl)-phenylazo-4-hydroxy-1-naphthoxy]-propionic acid

It is to be noted that α-[2'-(N-butyl)-carbamyl-phenylazo-4-hydroxy-1-naphthoxy]-propionic acid (Compound 9) cannot be prepared by the synthesis previously described since attempted diazotization of o-(N-butyl)-carbamyl-aniline causes cyclization. Hence, to form Compound 9, it is first necessary to form α-[2-(o-carbomethoxy)-phenylazo-4-hydroxy-1-naphthoxy] - propionic acid (Compound 8) and then react this compound with n-butyl amine to form Compound 9.

While compounds 6–19 are derivatives of Compound 1, the preferred compound of Formula B, it will be appreciated that the derivatives of other compounds of Formula B, e.g., derivatives of Compounds 2–5, may be prepared by appropriate substitution of the starting material, e.g., by selection of the desired compound of Formula C.

As was indicated heretofore, the compounds of Formula B are particularly useful as starting materials in the preparation of the azo dyes of Formula D. These latter compounds, as will be more apparent hereinafter, in turn have special utility themselves as intermediates.

While the compounds of Formula D are azo dyes and may be employed as such, these compounds are particularly useful in the synthesis of the compounds described and claimed in copending application Ser. No. 262,356 filed concurrently now U.S. Patent No. 3,256,269. These latter compounds are in turn particularly useful in the synthesis of the dye developers (dyes which are also silver halide developing agents) described and claimed in copending application Ser. No. 262,358 also filed concurrently.

Where W of Formula D contains a silver halide developing agent, e.g., a dihydroxyphenyl radical (e.g., Compounds 15, 17 and 19), the compound is itself a dye developer and may be used in photographic products, processes and compositions such as described and claimed in U.S. Patent No. 2,983,606. However, if these compounds are to be used as intermediates in the synthesis of the novel compounds disclosed and claimed in the aforementioned copending applications, the hydroxy groups of the dihydroxyphenyl developing function should first be protected.

The following examples show by way of illustration and not by way of limitation the preparation of the novel compounds of this invention:

Example I

α-(4-hydroxy)-1-naphthoxypropionic acid (Compound 1). 1,4-naphthoquinone (0.144 mole) and stannous chloride (0.144 mole, anhydrous) were dissolved at room temperature with stirring in 350 ml. of ethyl lactate. The solution was cooled to 5–10° C. and hydrogen chloride was bubbled through the solution at a brisk rate for 6 hours (the temperature of solution being held at 5–10° C.). The resultant clear reaction solution was poured into 750 ml. of a water-ice mixture. The oil which separated upon standing was separated by decantation of the water phase. The oily product was washed with a small volume of water then hydrolyzed. Nitrogen was bubbled through the water slurry for 1 hour with stirring. Nitrogen bubbling was continued while a solution of sodium hydroxide (.28 mole in 150 ml. of water purged for 1 hour with $N_2$) was added over a 5 min. period with stirring (at room temperature). The resultant clear basic solution was stirred for an additional 15 mins. and then acidified (to a pH of 2) by the slow addition of 6 N hydrochloric acid (keeping a nitrogen atmosphere until the hydrolysis mixture was acidic). The precipitate was dissolved in sodium bicarbonate solution, the insoluble impurities removed by filtration, and the product precipitated from the filtrate by acidification with dilute hydrochloric acid. The coupler obtained had M.P. 154–161° C. and was purified further by recrystallization from toluene, M.P. 157–159° C.

Elemental analysis of the product as $C_{13}H_{12}O_4$: Found: C, 67.1; H, 5.2. Calculated: C, 67.2; H, 5.19.

Example II

α - [3-(2'-methoxy)-phenylazo-4-hydroxy-1-naphthoxy] propionic acid (Compound 6): o-anisidine (.022 mole) was diazotized with sodium nitrite (.022 mole) and hydrochloric acid (.066 mole) in 50 ml. of water, under cooling. After being allowed to stand, the cooled diazonium solution was slowly added (over a ten minute period) to a solution of .020 mole of α-(4-hydroxy-1-naphthoxy)-propionic acid prepared as in Example 1, in an acetone-water mixture containing an excess of sodium bicarbonate. The sodium salt of the dye acid which had precipitated from the coupling mixture was converted to the dye acid upon acidification of the coupling mixture with dilute hydrochloric acid. The precipitated acid was recrystallized from methyl Cellosolve affording α-[3-(2'-methoxy)-phenylaxo-4-hydroxy-1-naphthoxy]-propionic acid, M.P. 248–249° C., in 90% yield.

Example III

α - [3 - (p-acetamido)-phenylazo-4-hydroxyl-1-naphthoxy]-propionic acid (Compound 7) was prepared in a manner similar to that set forth in Example II by using p-acetamidoaniline in place of o-anisidine. The product, recrystallized from cold ethanol had a M.P. of 224° C. and a $\lambda_{max}$ of 531 mμ in methyl cellulose.

Example IV

α - [3 - (2' - carbomethoxy) - phenylazo - 4-hydroxy-1-naphthoxy]-propionic acid (Compound 8) was prepared in a manner similar to that set forth in Example II by using methyl anthranilate in place of o-anisidine.

Example V

α - [3 - (2' - [N-butyl]-carbamyl)-phenylazo-4-hydroxy-1-naphthoxy]-propionic acid (Compound 9) was prepared by refluxing 5.37 gm. of α-[3-(2'-carbomethoxy)-phenylazo-4-hydroxy-1-naphthoxy]-propionic acid (.137 moles) in dry butylamine for 4¾ hours in an inert atmosphere. The reaction mixture was poured into dilute acid and the precipitate collected and recrystallized from dioxane, M.P. 215–217° C.

Example VI

α - [3 - (2' - methoxy-5'-methyl)-phenylazo-4-hydroxy-1-naphthoxy]-propionic acid (Compound 10) was prepared in a manner similar to that set forth in Example II, substituting 2-methoxy-5-methyl aniline for o-anisidine. The product was recrystallized from methyl cellulose, M.P. 235–336° C. and $\lambda_{max}$ of 546 mμ in methyl Cellosolve.

Example VII

α - [3 - (4'-methyl)-phenylazo-4-hydroxy-1-naphthoxy]-propionic acid (Compound 11) was prepared in a manner similar to that set forth in Example II substituting p-toluidine for o-anisidine. The product, recrystallized from benzene, had a M.P. of 217–219° C. and a $\lambda_{max}$ of 530mμ in methyl Cellosolve.

Example VIII

α - [3 - (2' - chloro-4'-methyl)-phenylazo-4-hydroxy-1-naphthoxy]-propionic acid (Compound 12) was prepared in a manner similar to that set forth in Example II substituting 2-chloro-4-methyl-aniline for o-anisidine. The product, recrystallized from methyl Cellosolve, had a M.P. 235–236° C. and a $\lambda_{max}$ of 525 mμ in methyl Cellosolve.

Example IX

α - [3 - (2',4',6' - trimethyl) - phenylazo - 4-hydroxy-1-naphthoxy]-propionic acid (Compound 13) was prepared in a manner similar to that set forth in Example II substituting o-mesidine for o-anisidine. The product, recrystallized from carbon tetrachloride, had a M.P. 239–242° C. and a $\lambda_{max}$ of 526 mμ in methyl Cellosolve.

Example X

α - [3-4'-(β-2'',5''-diacetoxyphenethyl)-phenylazo-1-hydroxy-1-naphthoxy]-propionic acid (Compound 14): p-(β-2,5-diacetoxyphenethyl) aniline hydrochloride (.015 mole) was diazotized with sodium nitrite (.015 mole) and hydrochloric acid (.030 mole) in 50 ml. water at 0–5° C. and the slight excess of nitrous acid was decomposed with sulfamic acid. The diazonium solution (0–5° C.) was added over a 10 minute period to a solution (at 10° C.) of α-(4-hydroxy-1-naphthoxy)-propionic acid (.015 mole) in an acetone-water mixture containing sodium bicarbonate (excess). The reaction mixture was acidified with dilute hydrochloric acid to dissolve the sodium salt of the dye acid (which had separated during the coupling) and to precipitate the dye acid. The solid was collected and recrystallized from benzene affording α-[3-p-(β-2',5'-diacetoxyphenethyl) - phenylazo-4-hydroxy-1-naphthoxy]-propionic acid.

Example XI

α - [3-p-(β-hydroquinonylethyl)-phenylazo-4-hydroxy-1-naphthoxy]-propionic acid (Compound 15). Hydrolysis of a solution of α-[3-p-(β-2',5'-diacetoxyphenethyl)-phenylazo-4-hydroxy-1-naphthoxy]-propionic acid (as prepared in Example X) in methyl Cellosolve with aqueous sodium hydroxide in an oxygen-free atmosphere for one hour, followed by precipitation with direct hydrochloric acid yielded α - [3 - p-(β-hydroquinonylethyl)-phenylazo-4-hydroxy-1-naphthoxy]-propionic acid, having a M.P. of 193–194.5° C. and a $\lambda_{max}$ of 532 mμ in methyl Cellosolve.

Example XII

α - [3 - (p - dicathyloxyhomogentisamido)-phenylazo-4-hydroxy-1-naphthoxy]-propionic acid (Compound 16) was prepared in a manner similar to that set forth in Example X, substituting dicathyloxyhomogentisamido aniline for p-(β-2,5-diacetoxyphenethyl)-aniline hydroxide. The product (Compound 16) had a $\lambda_{max}$ of 540mμ in methyl Cellosolve.

Example XIII

α - [3 - (p - homogentisamido) - phenylazo-4-hydroxy-1-naphthoxy]-propionic acid (Compound 17) was prepared by hydrolyzing α - [3 - (p-dicathyloxyhomogentisamido)-phenylazo-4-hydroxy-1-naphthoxy]-propionic acid (as prepared in Example XII) in a manner similar to the hydrolysis step illustrated in Example XI. The product (Compound 17) had a M.P. of 198–203° C.

Example XIV

α - [3-4'-(2",5"-diacetoxyphenylethyl)-phenylazo-4-hydroxy-1-naphthoxy]-propionic acid (Compound 18) was prepared in a manner similar to that set forth in Example X substituting 2,5-diacetoxybenzylaniline for p-(β-2,5-diacetoxyphenethyl)-aniline hydrochloride. The product (Compound 18) had a $\lambda_{max.}$ of 530 mμ in methyl Cellosolve.

Example XV

α - [3 - (p - hydroquinonylmethyl) - phenylazo - 4 - hydroxy-1-naphthoxy]-propionic acid (Compound 19) was prepared by hydrolyzing α - [3-(p-2',5' - diacetoxyphenylmethyl) - phenylazo - 4 - hydroxy-1-naphthoxy)-propionic acid (as prepared in Example XIV) in a manner similar to that illustrated in Example XI. The product (Compound 19) was found to be 98% pure by paper chromatography using chloroform as eluant.

Since certain changes may be made in the above product and process without departing from the scope of the invention herein involved, it is intended that all matter contained in the above description shall be interpreted as illustrative and not in a limiting sense.

What is claimed is:

1. A compound of the formula:

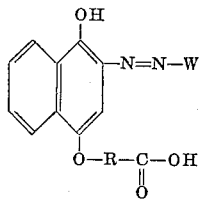

wherein R is a lower alkylene group; and W is the radical of a diazotizable amine of the benzene seriees.

2. α - [3 - (2'-methoxy)-phenylazo-4-hydroxy-1-naphthoxy]-propionic acid.
3. α - [3-(p-acetamido)-phenylazo-4-hydroxy-1-naphthoxy]-propionic acid.
4. α - [3 - (2' - carbomethoxy)-phenylazo-4-hydroxy-1-naphthoxy]-propionic acid.
5. α - [3 - (2' - [N - butyl] - carbamyl)-phenylazo-4-hydroxy-1-naphthoxy]-propionic acid.
6. α - [3 - (2' - methoxy - 5' - methyl)-phenylazo-4-hydroxy-1-naphthoxy]-propionic acid.
7. α - [3 - (4'-methyl)-phenylazo-4-hydroxy-1-naphthoxy]-propionic acid.
8. α - [3 - (2'-chloro-4'-methyl)-phenylazo-4-hydroxy-1-naphthoxy]-propionic acid.
9. α - [3 - (2',4',6'-trimethyl)-phenylazo-4-hydroxy-1-naphthoxy]-propionic acid.
10. α - [3 - 4'-(β-2",5"-diacetoxyphenethyl)-phenylazo-4-hydroxy-1-naphthoxy]-propionic acid.
11. α - [3-(p-dicathyloxyhomogentisamido)-phenylazo-4-hydroxy-1-naphthoxy]-propionic acid.
12. α - [3 - (p-homogentisamido)-phenylazo-4-hydroxy-1-naphthoxy]-propionic acid.
13. α - [3 - 4'-(2",5"-diacetoxyphenylmethyl)-phenylazo-4-hydroxy-1-naphthoxy]-propionic acid.
14. α - [3 - (p-hydroquinonylmethyl)-phenylazo-4-hydroxy-1-naphthoxy]-propionic acid.
15. α - [3 - p-(β-hydroquinonylethyl)-phenylazo-4-hydroxy-1-naphthoxy]-propionic acid.
16. The method of preparing compounds of the formula:

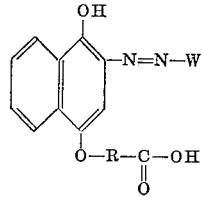

wherein R is a lower alkylene group, and W is the radical of a diazotizable amine of the benzene series W—NH$_2$, which comprises the steps of (a) reacting naphthoquinone with a compound of the formula:

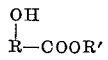

wherein R' is an alkyl group, said reaction being performed in the presence of a reducing agent to form a compound of the formula:

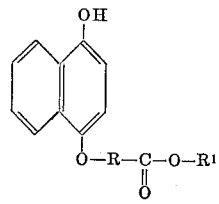

(b) hydrolyzing the resulting product to remove said —R' substituent, thereby forming the acid derivative thereof; and (c) reacting said last-named compound with a diazonium salt of said amine to form a compound of said first-named formula.

References Cited

UNITED STATES PATENTS

| | | | |
|---|---|---|---|
| 2,352,189 | 6/1944 | Fernholz | 260—502 |
| 2,590,086 | 3/1952 | Burtner | 260—502 |
| 2,808,400 | 10/1957 | Struve et al. | 260—202 |
| 3,086,005 | 4/1963 | Idelson | 260—202 |
| 3,134,764 | 5/1964 | Blout et al. | 260—202 X |

CHARLES B. PARKER, *Primary Examiner.*

R. J. FINNEGAN, D. M. PAPUGA, *Assistant Examiners.*